(12) United States Patent
Herman (10) Patent No.: US 11,011,986 B2
(45) Date of Patent: May 18, 2021

(54) HIGH ENERGY PULSE ON A HIGH-VOLTAGE-DIRECT-CURRENT OFFSET

(71) Applicant: Advanced Energy Industries, Inc., Fort Collins, CO (US)

(72) Inventor: Donnie Herman, Olcott, NY (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 0 days.

(21) Appl. No.: 16/530,411

(22) Filed: Aug. 2, 2019

(65) Prior Publication Data
US 2021/0036611 A1  Feb. 4, 2021

(51) Int. Cl.
*H02M 3/158* (2006.01)
*H02M 3/07* (2006.01)
(Continued)

(52) U.S. Cl.
CPC ............. *H02M 3/158* (2013.01); *H02M 3/07* (2013.01); *H02M 7/5387* (2013.01); *H02M 7/7575* (2013.01); *H02M 2007/4835* (2013.01)

(58) Field of Classification Search
CPC .... H03K 17/161; H03K 17/302; H03K 17/56; H03K 17/567; H03K 17/60; H03K 17/687; H03K 17/6871; H03K 17/16; H03K 17/30; H03K 17/601; H03K 17/64; H03K 17/691; H03K 17/731; H03K 17/10; H03K 17/102; H03K 17/107; H03K 17/12; H03K 17/122; H03K 17/127; H03K 19/00346; H03K 19/00353; H03K 19/00361; H03K 19/003; H03K 19/00307; H03K 19/00315; H04L 25/026; G11B 5/02; G11B 5/022; H02M 5/40; H02M 5/42; H02M 5/44; H02M 5/443; H02M 5/45; H02M 5/4505; H02M 5/451; H02M 5/452; H02M 5/458; H02M 5/4585; H02M 1/12; H02M 1/42; H02M 1/4225; H02M 1/4233; H02M 1/4241;
(Continued)

(56) References Cited

U.S. PATENT DOCUMENTS 9,755,641 B1 * 9/2017 Bhutta ............ H03K 19/017536
9,966,837 B1 * 5/2018 Seaton .................. H02M 3/155
(Continued)

FOREIGN PATENT DOCUMENTS

WO    2008106546 A2    9/2008

*Primary Examiner* — Bryan R Perez
(74) *Attorney, Agent, or Firm* — Neugeboren O'Dowd PC (57) ABSTRACT

Pulse power supply systems and methods are disclosed. A method includes providing earth-ground-referenced control circuitry and providing floating pulsed-power circuitry. The method also includes providing a DC offset voltage to the return port of the pulsed-power circuitry with a DC offset module and providing a peak voltage to the pulsed-power circuitry with a DC voltage source. Power is applied from a power source of the control circuitry to a driver of the pulsed-power circuitry via a galvanically-isolating power path and a trigger signal is applied from the control circuitry to the driver via a galvanically-isolated signal path to prompt the driver to produce a driver signal. A voltage pulse is produced between the output port and the return port by closing the switch with the driver signal to couple the peak voltage to the output port.

13 Claims, 9 Drawing Sheets

(51) Int. Cl.
  *H02M 7/757*    (2006.01)
  *H02M 7/5387*   (2007.01)
  *H02M 7/483*    (2007.01)
(58) Field of Classification Search
  CPC ... H02M 1/4258; H02M 1/425; H02M 1/4208
  See application file for complete search history.

(56) References Cited

U.S. PATENT DOCUMENTS

2017/0288434 A1* 10/2017 Narita ............... H02M 3/33523
2019/0158027 A1   5/2019 Williams

* cited by examiner

HIGH ENERGY PULSE ON A HIGH-VOLTAGE-DIRECT-CURRENT OFFSET

BACKGROUND

Field

The present invention relates generally to power supplies, and more specifically to pulsed power supplies.

Background

There are several applications for pulsed power including semiconductor processing, piezo drivers, and component testing. Typically, an amplitude of the voltage of the pulsed power alternates between a minimum value and a maximum value, and the time duration of the voltage waveform at the minimum and maximum values may vary depending upon the application. Moreover, the value of the minimum and maximum values may vary from cycle to cycle depending upon the application.

Creating voltage pulses that transition nearly instantaneously between minimum and maximum values is a challenge even in low voltage applications. But in high voltage applications, creating almost instantaneous transitions is very difficult, and many applications are increasingly demanding higher and higher voltage levels.

In the past, high voltage amplifiers have been used to provide a high voltage output. In some cases, these amplifiers are floated onto a high voltage direct-current (HVDC) offset using a HVDC supply. But many high voltage amplifiers suffer from an insufficient slew rate to provide the type of fast transition time that is often desired. As a consequence, existing approaches to creating voltage pulses are often unsatisfactory, and in the future these existing approaches are likely to become even more deficient at high voltage levels.

SUMMARY

An aspect may be characterized as a pulsed power system that includes a DC voltage source configured to provide a DC output voltage, an output port, and a switch coupled between the DC voltage source and the output port that closes in response to a drive signal from a driver. A DC offset module is coupled between a ground connector and the return port, and the DC offset module is configured to provide a DC offset voltage. A controller is coupled to the driver via an isolation path, and the controller is configured to produce a pulsed voltage between the output port and the return port by sending control signals via the isolation path to the driver to open and close the switch.

According to another aspect, a method for applying pulsed power to a load includes providing earth-ground-referenced control circuitry and providing floating pulsed-power circuitry. The method also includes providing a DC offset voltage to the return port of the pulsed-power circuitry with a DC offset module and providing a peak voltage to the pulsed-power circuitry with a DC voltage source. Power is applied from a power source of the control circuitry to a driver of the pulsed-power circuitry via a galvanically-isolating power path and a trigger signal is applied from the control circuitry to the driver via a galvanically-isolated signal path to prompt the driver to produce a driver signal. A voltage pulse is produced between the output port and the return port by closing the switch with the driver signal to couple the peak voltage to the output port.

Yet another aspect may be characterized as a pulsed power system that includes a DC voltage source configured to provide a DC output voltage, an output port, a first switch coupled between the DC voltage source and the output port, and a second switch coupled between a return port and the output port. A DC offset module is coupled between a ground connector and the return port, and the DC offset module is configured to provide a DC offset voltage. A controller is coupled to the first driver via a first isolation path, and the controller is coupled to the second driver via a second isolation path. The controller is configured to produce a pulsed voltage between the output port and the return port by sending control signals via the isolation paths to the drivers to alternately open and close the first and second switches.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
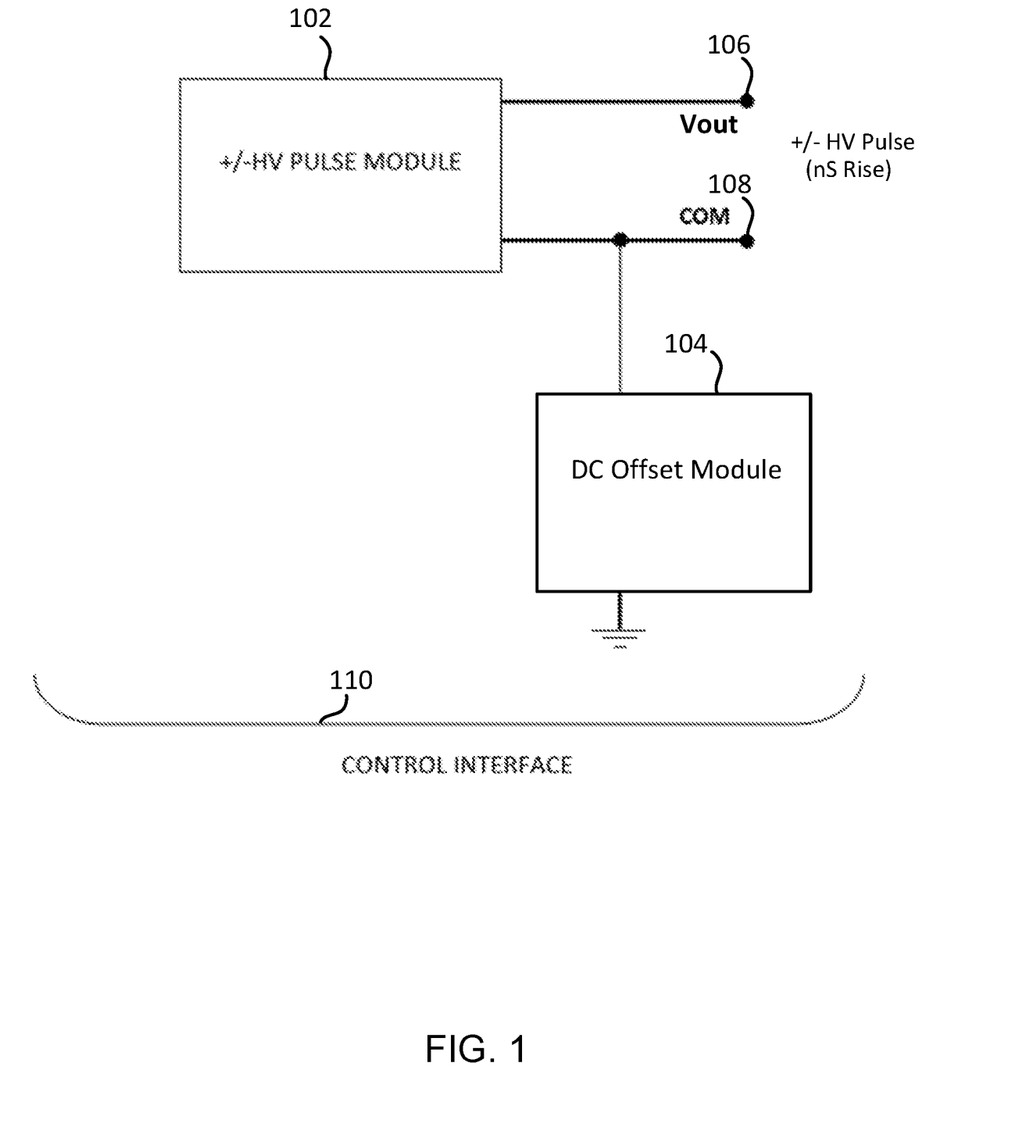
FIG. 1 is a block diagram depicting aspects of a pulsed power system.

Referring first to FIG. 1, shown is a block diagram depicting aspects of embodiments described further herein. As shown, a high voltage (HV) pulse module 102 is shown floating (relative to earth ground) on top of a high voltage that is applied by an earth-grounded DC offset module 104. More specifically, the HV pulse module 102 provides an output voltage, Vout, at an output port 106, and the HV pulse module 102 is coupled the DC offset module 104 at a common, return port 108. Also generally depicted is a control interface 110 that enables control of both the HV pulse module 102 and the DC offset module 104.

In general, the HV pulse module 102 functions to apply a pulsed voltage (that may vary in amplitude and/or pulse width) across the output port 106 and the return port 108. For example, the peak-to-peak voltage differential applied by the HV pulse module 102 across the output port 106 and the return portion 108 may be between +/−100 volts and 10000 volts, but this voltage range is only exemplary. But it should be recognized that this voltage differential is not referenced to ground. More specifically, the DC offset module 104 functions to "push" the voltage at the return port 108 to a voltage that is offset from ground. For example, the offset voltage applied by the DC offset module 104 may be between +/−0 volts and 10 kV, but this range is only exemplary. As a more specific example, the DC offset may be 8 kV and the peak-to-peak voltage applied by the HV pulse module 102 may be 1 kV; thus, relative to ground, the voltage at the output port 106 in this example varies between 8 kV and 9 kV.

Beneficially, the HV pulse module 102 is able to provide the pulsed voltage so that a rise time of a rising edge of the pulsed voltage is very short as compared to a high voltage amplifier, and the DC offset module 104 provides the high voltage offset that is desired for many applications. In short, embodiments described herein provide a system that controls floating high energy pulses to enable delivery of high voltage pulses on a high voltage DC offset in a robust and reliable way.

When a HV pulse is set on a HV offset, careful consideration must be used to handle high peak currents at high voltages. Among these considerations is the need for isolating the high current and high voltage (that may be demanded by an application) from the voltage control circuitry. Moreover, the current drawn by a load may have enormous peak values, and these levels of current must be delivered by a robust design.

Figure 2:
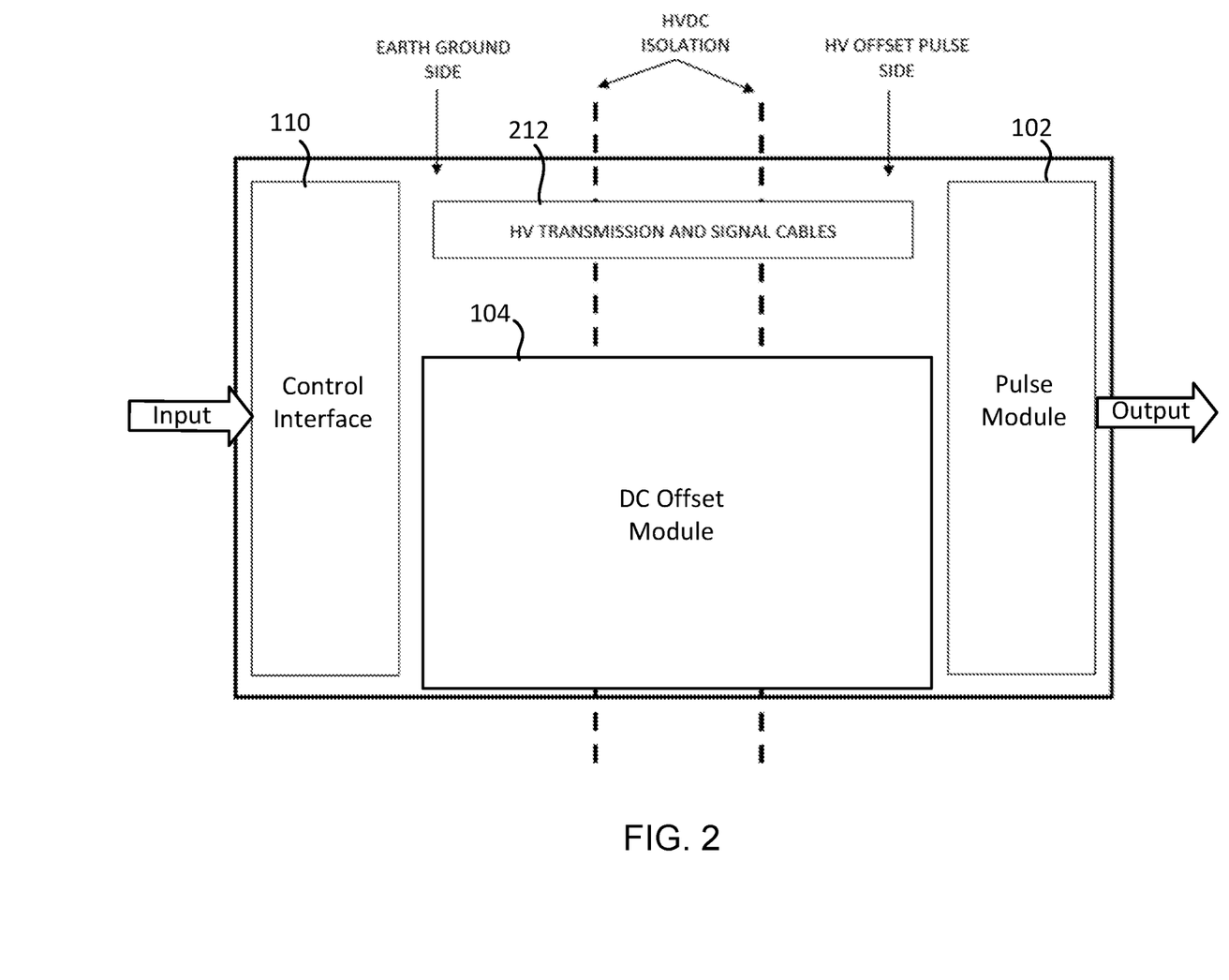
FIG. 2 is a block diagram depicting functional components of an exemplary embodiment of the pulsed power system of FIG. 1.

Referring next to FIG. 2, shown is a block diagram depicting functional components of the pulsed power system of FIG. 1. As shown, the pulsed power system is depicted with an earth-ground side and high-voltage-pulse side. As shown, the earth-ground side includes the control interface 110, and the high-voltage-pulse side includes the HV pulse module 102. To mitigate against potentially damaging and dangerous interaction between the earth-ground side and the high-voltage-pulse side, high voltage isolation is provided by HV transmission and signal cables 212 and the DC offset module 104.

It should be recognized that the depiction of components in FIG. 2 is logical and that FIG. 2 is not intended to be a hardware diagram. For example, some of the depicted components may be realized by a collection of distributed hardware and/or software components. As another example, multiple components may be realized by a collection of integrated hardware components. As a more specific example, the control interface 110 may be realized by several, separate microcontrollers; application specific integrated circuits; field programmable gate arrays; digital logic; etc. And these several components may be interconnected by networked communication. Alternatively, the control interface may be realized by a single integrated construct such as a programmed microcontroller or general-purpose computer programmed with software to provide a special purpose computer.

The constituent components depicted in FIG. 2 may be realized in an integrated manner (e.g., on a single printed circuit board) within a common housing, or the constituent components may be distributed across separate devices. As an example, the HV pulse module 102 may be implemented on a separate printed circuit board, and the HV pulse module 102 may be connected to the other depicted components by the high voltage transmission and signal cables 212.

Figure 3:
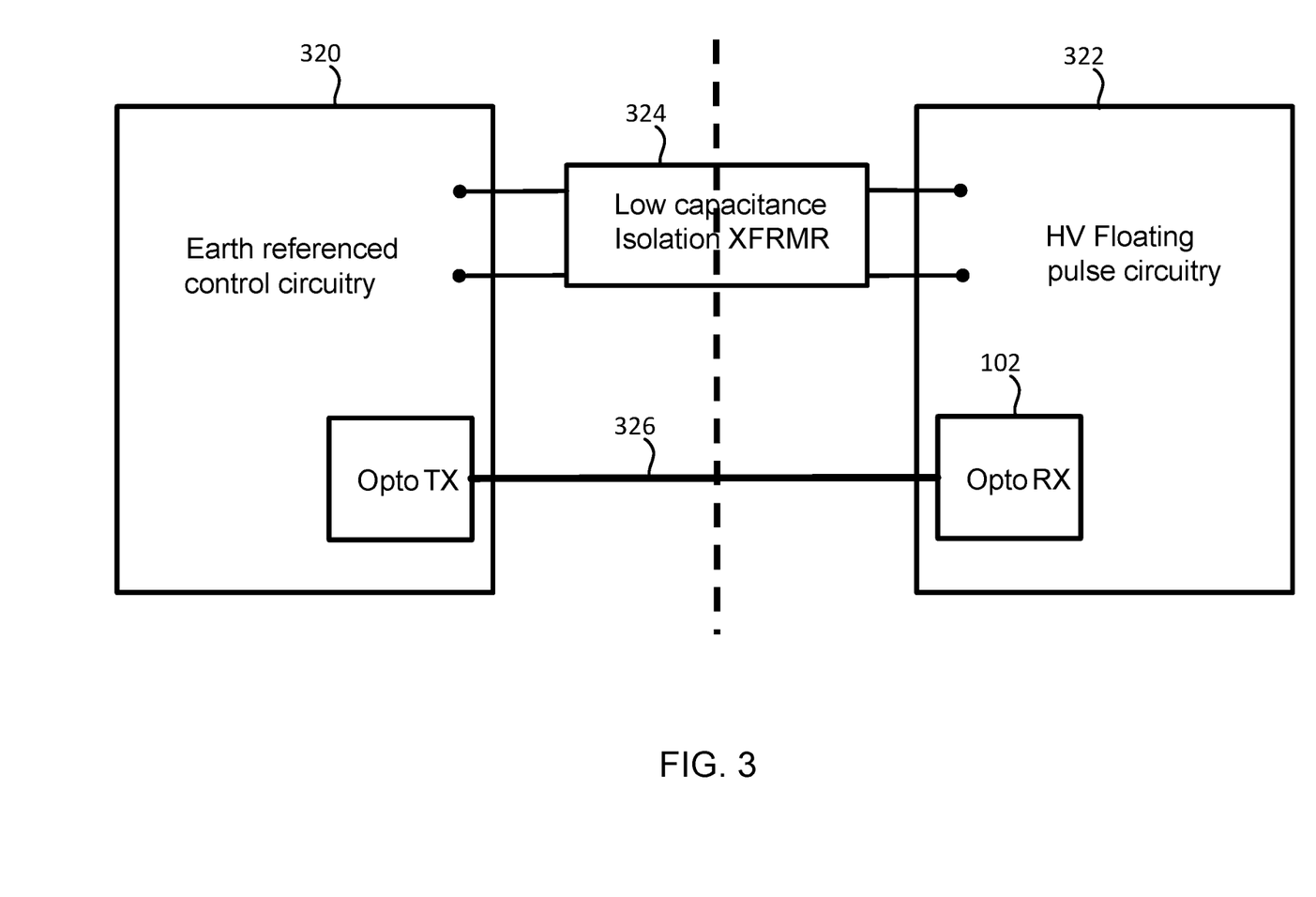
FIG. 3 is a is a block diagram depicting an exemplary approach to isolating earth-ground-referenced control circuitry from floating high-voltage pulse circuitry.

Referring next to FIG. 3, shown is a block diagram depicting an exemplary approach to isolating earth-ground-referenced control circuitry 320 from floating high-voltage pulse circuitry 322 of the HV pulse module 102. As shown, the earth-ground referenced control circuitry 320 may be isolated from the floating high-voltage pulse circuitry 322 by: a) one or more low-capacitance isolation transformer(s) 324 and b) one or more optical-isolation connection(s) 326. As depicted, the low-capacitance transformer(s) 324 may be used to propagate low voltage control power (from the earth-ground-referenced control circuitry 320) to drivers of switches (e.g., metal oxide semiconductor field effect transistors (MOSFETs) or insulated gate bipolar transistors (IGBTs), etc.) of the high-voltage pulse circuitry 322. In addition, the optical isolation connections 326 may propagate signals (from the earth-ground-referenced control circuitry 320) that trigger a state change of the switches (from opened to closed and vice versa) on the side of the high-voltage pulsed circuitry 322.

Figure 4:
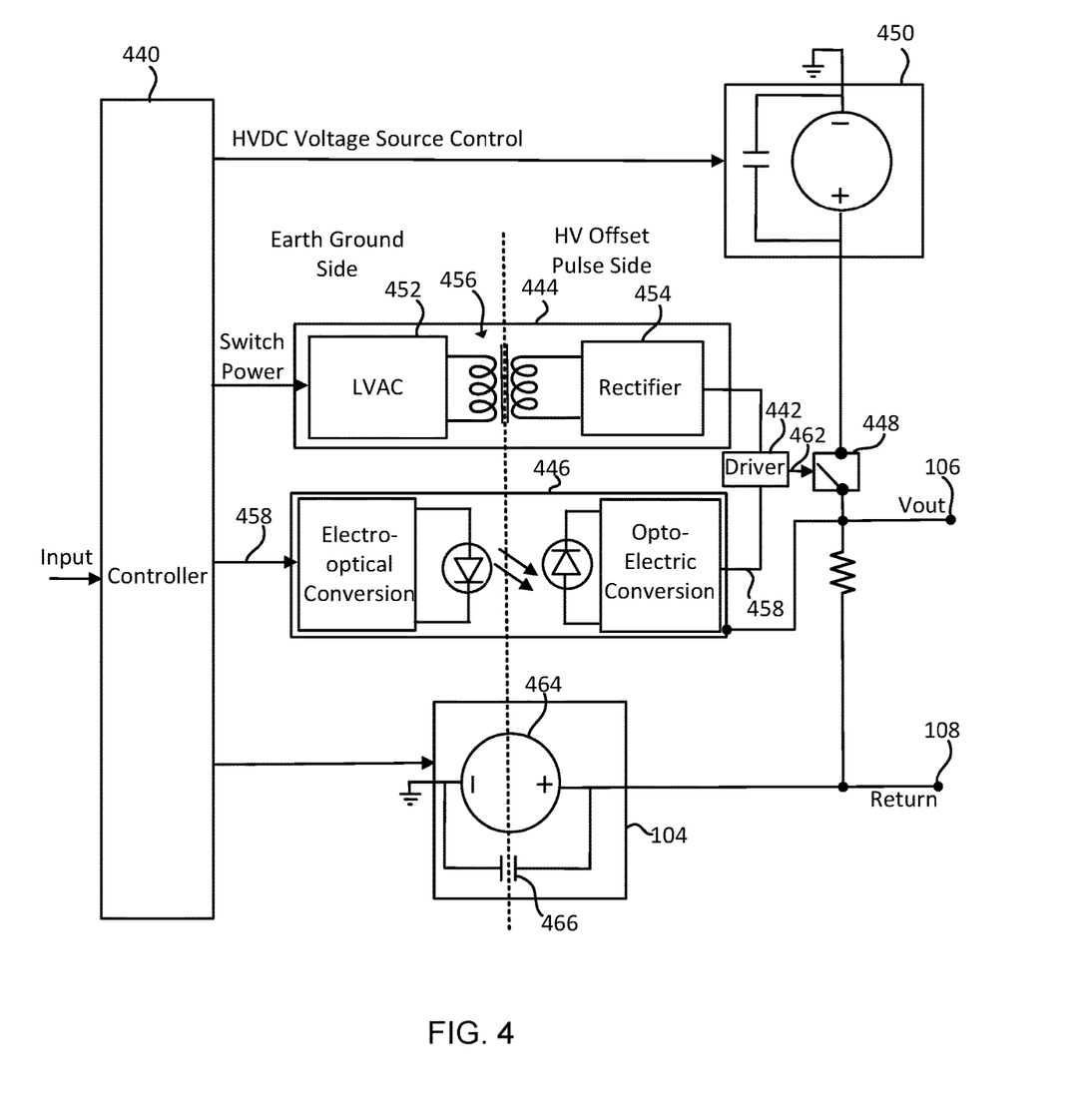
FIG. 4 is a schematic diagram depicting components of an exemplary embodiment of a pulsed power system.

Referring next to FIG. 4, shown is a diagram depicting components of an exemplary pulsed power system. As shown, a controller 440 is positioned on an earth-ground side of the system, and the controller 440 is coupled to a driver 442 via an inductive isolation path 444 and an optical isolation path 446. In addition, the controller 440 is coupled to the DC offset module 104, and the DC offset module 104 is coupled to the output port 106 via a resistor. As shown, the driver 442 is coupled to a switch 448, and a high voltage direct current (HVDC) voltage source 450 is switchably coupled to the output port 106.

In general, the inductive isolation path 444 functions to couple power from the earth-ground side to the driver 442 to enable the driver 442 to apply power to the switch 448, and hence, close the switch 448 in response to a trigger signal that is sent from the controller 440 to the driver 442 via the optical isolation path 446. As shown, the inductive isolation path 444 may include a low voltage AC power supply 452 that is coupled to a rectifier 454 via a transformer 456. In operation, the low voltage AC power supply 452 applies an AC voltage that induces a corresponding AC voltage at the secondary of the transformer 456, and the rectifier 454 converts the AC voltage at the secondary of the transformer 456 to a rectified DC voltage that is applied to the driver 442.

The optical isolation path 446 generally functions to couple a trigger signal 458 from the controller 440 to the driver 442, which triggers the driver 442 to apply a drive signal to the switch 448 to prompt the switch 448 to close. As shown, the optical isolation component 446 may include an electro-optical conversion component to convert an electrical trigger signal 458 from the controller 440 to an optical signal that is received by an opto-electric conversion component. And the opto-electric conversion component converts the received optical signal back to an electrical signal that is applied to the driver 442 to trigger the driver 442 to apply the drive signal 462 to the switch.

The switch 448 may be realized by any of a variety of switch devices that operate to open and close as discussed herein to switchably couple and decouple the voltage (applied by the HVDC voltage source 450) to the output port 106. It is contemplated, for example, that metal oxide semiconductor field-effect transistors (MOSFETs) or insulated gate bipolar transistors (IGBTs) may be used. But as one of ordinary skill in the art will appreciate, potentially other switch devices could also be used depending upon the application and availability of switch devices that meet the required performance attributes of the application. In some applications, a MOSFET that operates up to 1 kV and 50 peak amps is utilized, but other applications may allow other switch devices to be used.

The driver 442 generally operates to apply the drive signal 462 to the switch that prompts the switch 448 to quickly close and open when the trigger signal 458 from the optical isolation component 446 is applied and removed, respectively. As those of ordinary skill in the art will appreciate, switches such as MOSFETs may require a substantial level of gate drive current to quickly respond. As an example, the driver 442 may provide 50 peaks amps at 30 DC volts as a drive signal to the switch 448.

As shown, the DC offset module 104 may include a controllable voltage source 464 arranged in parallel with a capacitor 466. The DC voltage source 464 operates to apply the DC offset voltage as discussed above, and the capacitor 466 facilitates regulation of the DC offset voltage in response to the quick switching that may occur.

Figure 5:
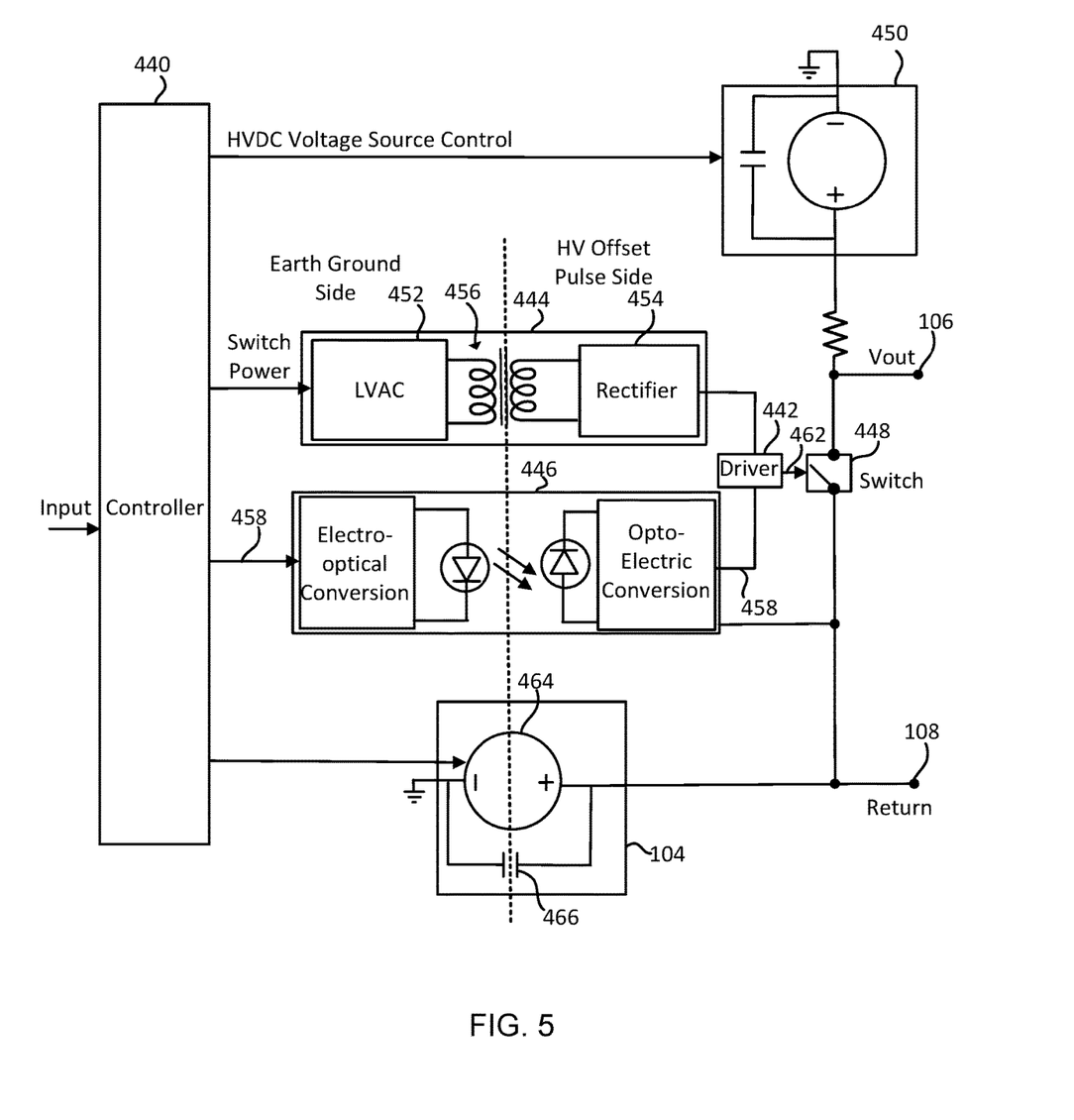
FIG. 5 is a is a schematic diagram depicting components of another exemplary embodiment of a pulsed power system.

The embodiment depicted in FIG. 4 is configured to provide voltage pulses with a relatively fast rise time by virtue of the resistor positioned between the DC offset module 104 and the switch 448. In contrast, the embodiment depicted in FIG. 5 is configured to provide voltage pulses with a relatively fast fall time. As shown, the pulsed DC power system depicted in FIG. 5 is the same as the system depicted in FIG. 4 except the resistor is moved from the position in FIG. 4 to be located between the HVDC voltage source 450 and the switch 448.

Figure 6:
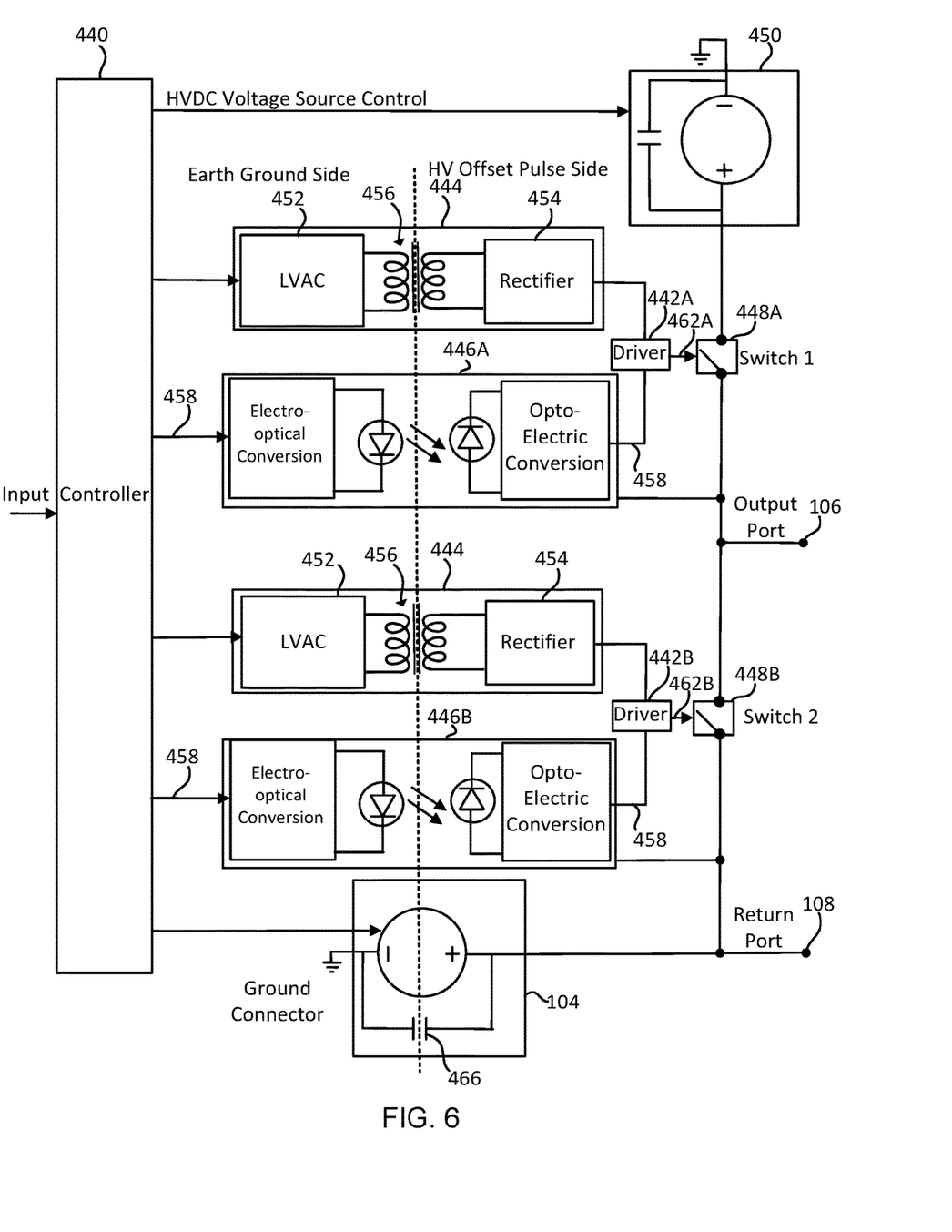
FIG. 6 is a is a schematic diagram depicting components of yet another exemplary embodiment of a pulsed power system.

Referring next to FIG. 6 shown is another embodiment of the pulsed power system that is configured in a push-pull topology. In this embodiment, a first switch 448A is coupled between the HVDC voltage source 450 and the output port 106, and the first switch 448A closes in response to a first drive signal 462A from a first driver 442A. A second switch 448B coupled between the return port 108 and the output port 106, and the second switch 448B closes in response to a second drive signal 462B from a second driver 442B. The DC offset module 104 is coupled between a ground connector and the return port 108.

In this embodiment, the controller 440 is coupled to the first driver 442A via a first optical isolation path 446A, and the controller 440 is coupled to the second driver 442B via a second optical isolation path 446B. In operation, the controller 440 is configured to produce a pulsed voltage between the output port 106 and the return port 108 by sending control signals, via the isolation paths 446A, 446B, to the drivers 442A, 442B to alternately open and close the first switch 448A and the second switch 448B.

In this mode of operation, when the first switch 448A is closed the second switch 448B is opened, and the DC voltage from the HVDC voltage source 450 is coupled to the output port 106 while the DC offset voltage from the DC offset module 104 is coupled to the return port 108. Briefly, both the first switch 448A and the second switch 448B are then opened before the second switch 448B is closed and the first switch 448A is opened. When the second switch 448B is closed (and the first switch 448A is opened), the DC offset voltage from the DC offset module 104 is applied to the output port 106. As one of ordinary skill in the art will appreciate, the length of time one of the switches is closed (while the other is opened) may be varied to effectuate pulse-width modulation of the voltage at the output ports 106, 108.

As shown, the inductive isolation paths 444 provide power from the low voltage AC power supplies 452 to the drivers 442A, 442B via the transformers 456 and rectifiers 454. In a variation of this embodiment, a single low voltage AC power supply (in a single inductive isolation path) may be used to provide power to both of the drivers 442A, 442B on the HV offset pulse side.

Figure 7:
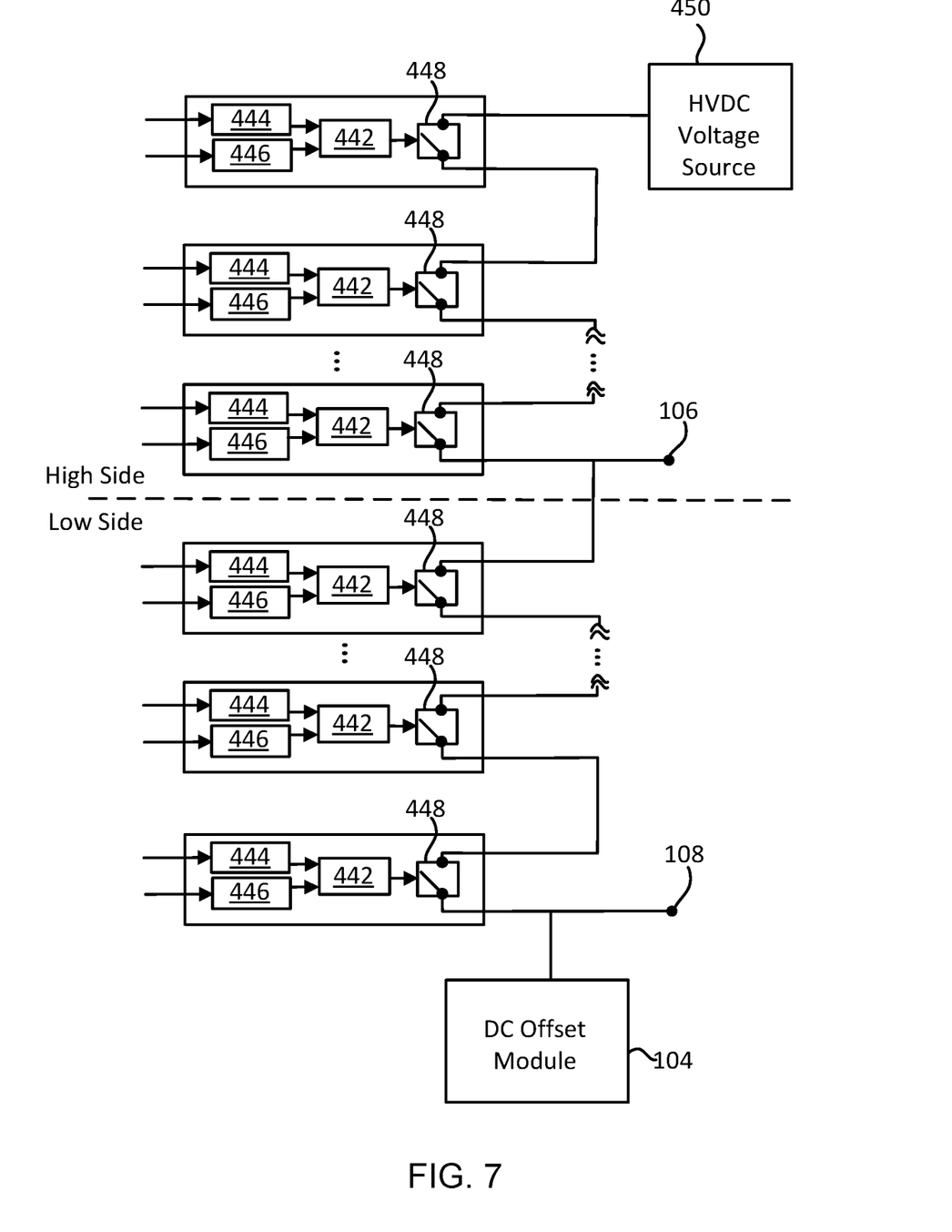
FIG. 7 is a block diagram depicting an implementation with cascoded modules.

Referring next to FIG. 7, shown is a block diagram depicted a cascaded arrangement of portions of the earth-ground-referenced control circuitry 320 and the floating pulsed-power circuitry 322. In this configuration, a voltage limitation of the switch 448 is overcome by the series arrangement of the switches 448 that is effectuated. For example, the switch 448 may be limited to operating at 1 kV, so the series configuration enables many switches to be stacked to very high voltage levels (e.g., 100 kV).

Figure 8:
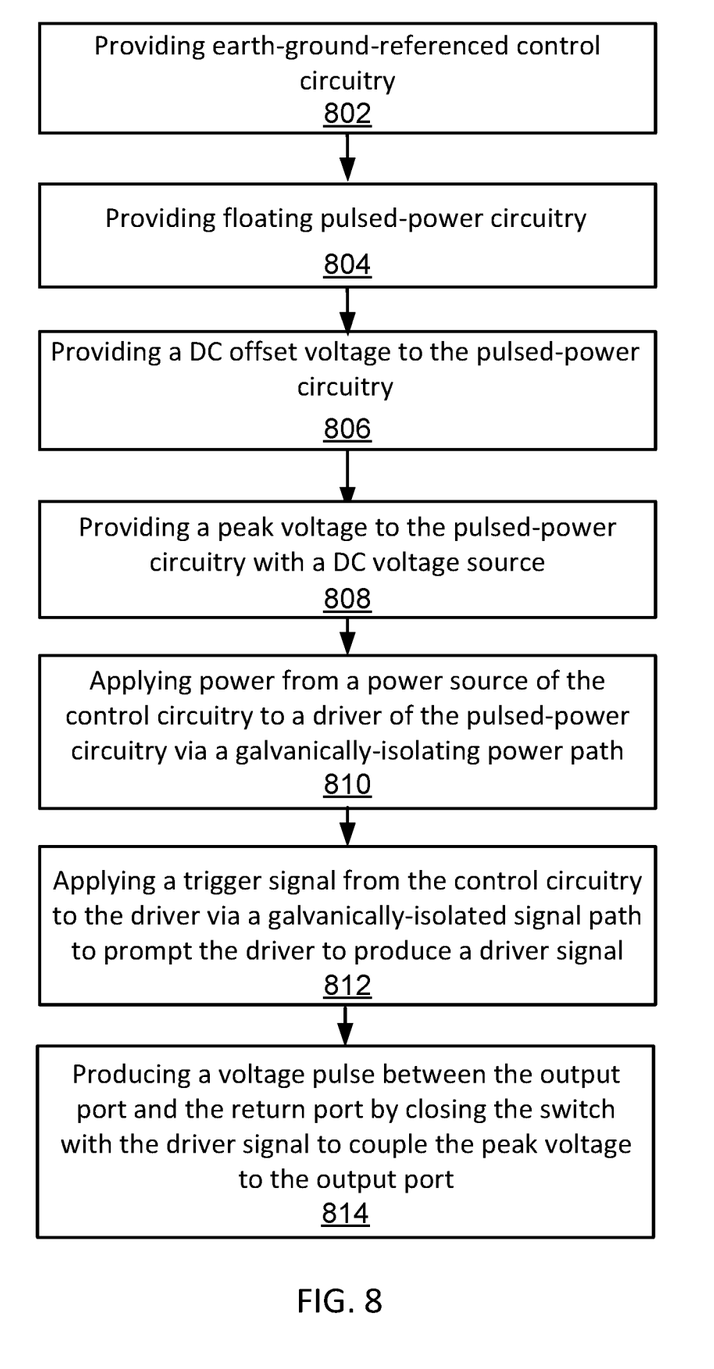
FIG. 8 is a flowchart depicting an exemplary method.

Referring next to FIG. 8, shown is a flowchart depicting a method that may be traversed in connection with the embodiments disclosed herein. As shown, earth-ground-referenced control circuitry 320 (e.g., the controller 440) is provided (Block 802) and floating pulsed-power circuitry (including the HVDC voltage source 450, driver(s) 442, switch(es) 448, output port 106 and return port 108) are provided (Block 804). In addition, a DC offset voltage is provided by the DC offset module 104 to the pulsed power circuitry (Block 806). A peak voltage is applied to the pulsed-power circuitry with the HVDC voltage source 450 (Block 808), and power from a power source (e.g., the low voltage AC power supply 452) of the control circuitry is applied to the driver 442 of the pulsed-power circuitry via a galvanically-isolating power path (e.g., the inductive isolation path 444)(Block 810). A trigger signal 458 from the control circuitry is applied to the driver 442 via a galvanically-isolated signal path (e.g., the optical isolation path 446) to prompt the driver 442 to produce a driver signal 462 (Block 812). A voltage pulse between the output port 106 and the return port 108 is produced by closing the switch 448 with the driver signal 462 to couple the peak voltage to the output port 106. It should be recognized that in some implementations (e.g., the implementation described with reference to FIG. 5) the peak voltage is coupled to the output port 106 via a resistor.

Figure 9:
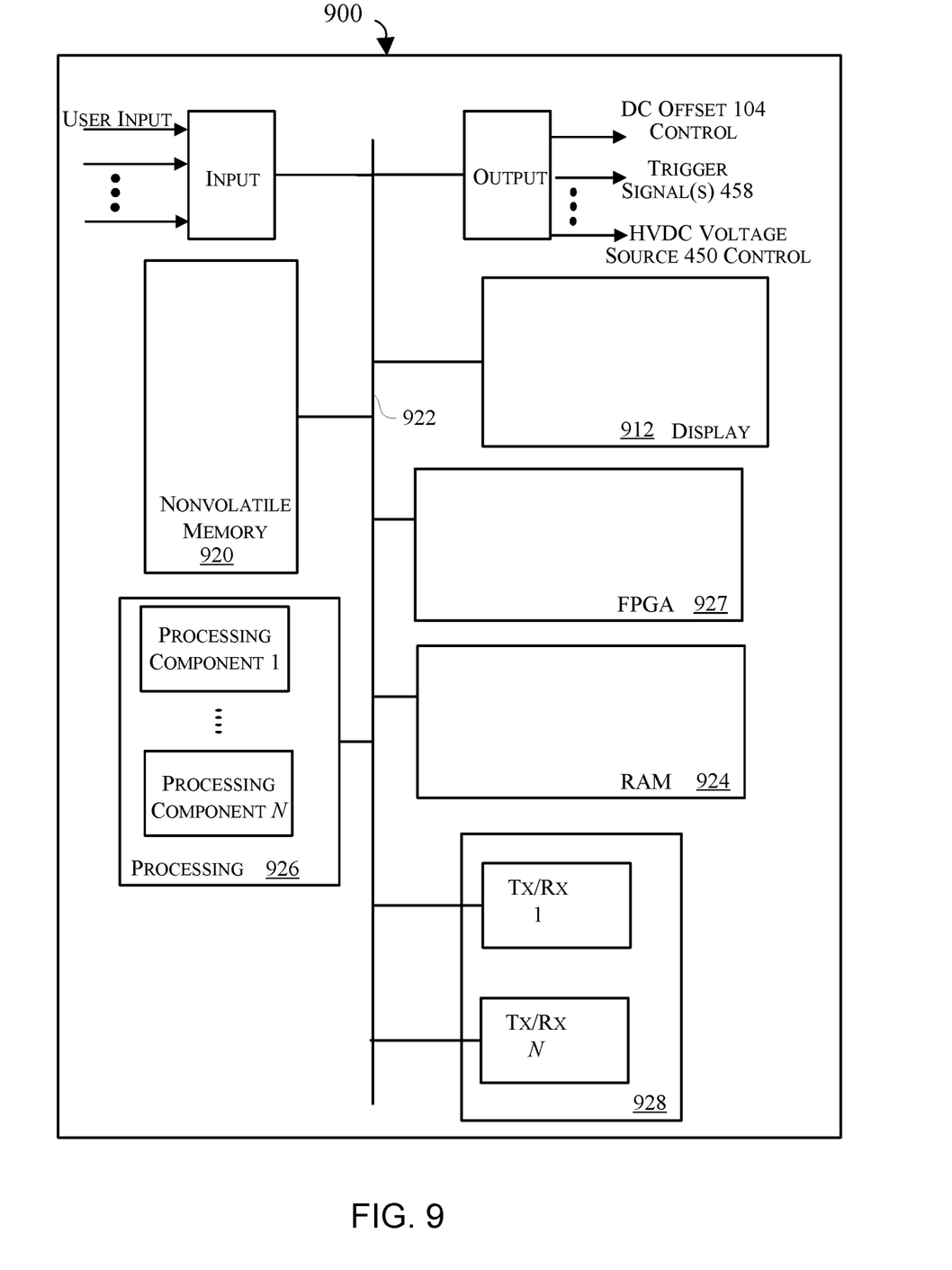
FIG. 9 is a block diagram depicting exemplary processing components.

The methods described in connection with the embodiments disclosed herein may be executed by hardware, in processor executable instructions encoded in non-transitory machine readable medium, or as a combination of the two. Referring to FIG. 9 for example, shown is a block diagram depicting physical components of an exemplary controller 900 that may be utilized to realize the controller 440 according to an illustrative embodiment of this disclosure. As shown, in this embodiment a display 912 and nonvolatile memory 920 are coupled to a bus 922 that is also coupled to random access memory ("RAM") 924, a processing portion (which includes N processing components) 926, a field programmable gate array (FPGA) 927, and a transceiver component 928 that includes N transceivers. Although the components depicted in FIG. 9 represent physical components, FIG. 9 is not intended to be a detailed hardware diagram; thus, many of the components depicted in FIG. 9 may be realized by common constructs or distributed among additional physical components. Moreover, it is contemplated that other existing and yet-to-be developed physical components and architectures may be utilized to implement the functional components described with reference to FIG. 9.

The display 912 may implement a portion of the control interface 110 for a user, and in several implementations, the display 912 is realized by a touchscreen display. For example, display 912 can be used to control and interact with the DC offset component 104 and the HVDC voltage source 450. A graphical user interface presented on the display 912 may enable a user to control aspects of the voltage waveform applied between the output port 106 and the return port 108, and the desired waveform may determine a timing of the switches 448. In general, the nonvolatile memory 920 is non-transitory memory that functions to store (e.g., persistently store) data and machine readable (e.g., processor executable) code (including executable code that is associated with effectuating the methods described herein). In some embodiments, for example, the nonvolatile memory 920 includes bootloader code, operating system code, file system code, and non-transitory processor-executable code to facilitate the execution of the methods described herein including aspects of the method described with reference to FIG. 8.

In many implementations, the nonvolatile memory 920 is realized by flash memory (e.g., NAND or ONENAND memory), but it is contemplated that other memory types may also be utilized. Although it may be possible to execute the code from the nonvolatile memory 920, the executable code in the nonvolatile memory is typically loaded into RAM 924 and executed by one or more of the N processing components in the processing portion 926.

In operation, the N processing components in connection with RAM 924 may generally operate to execute the instructions stored in nonvolatile memory 920 to realize aspects of the functionality of the controller 440. For example, non-transitory processor-executable instructions to effectuate the methods described herein may be persistently stored in nonvolatile memory 920 and executed by the N processing components in connection with RAM 924. As one of ordinary skill in the art will appreciate, the processing portion 926 may include a video processor, digital signal processor (DSP), graphics processing unit (GPU), and other processing components.

In addition, or in the alternative, the field programmable gate array (FPGA) 927 may be configured to effectuate one or more aspects of the methodologies described herein. For example, non-transitory FPGA-configuration-instructions may be persistently stored in nonvolatile memory 920 and accessed by the FPGA 927 (e.g., during boot up) to configure the FPGA 927 to effectuate the functions of the controller 114.

In general, the input component functions to receive analog and/or digital signals that may be utilized by the controller 440 as described herein. It should be recognized that the input component may be realized by several separate analog and/or digital input processing chains, but for simplicity, the input component is depicted as a single functional block. In operation, the input component may operate to receive signals (e.g., status signals) that are indicative of one or more voltages including the output voltage (across the output port 106 and 108). As shown, the input component may also receive a user input in an alternative mode to the display 912. The output component generally operates to provide one or more analog or digital signals to effectuate one or more operational aspects of the pulsed power system. For example, the output portion may provide signals to control voltages of the DC offset component 104 and/or the HVDC voltage source 450. It is also contemplated that the output component may provide trigger signals 458 to the optical isolation paths 446 to control (in an isolated manner) the opening and closing of the switches 448.

The depicted transceiver component 928 includes N transceiver chains, which may be used for communicating with external devices (e.g., external controllers) via wireless or wireline networks. Each of the N transceiver chains may represent a transceiver associated with a particular communication scheme (e.g., WiFi, ethernet, universal serial bus, profibus, etc.).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A pulsed power system comprising:
   a DC voltage source configured to provide a DC output voltage;
   an output port;
   a switch coupled between the DC voltage source and the output port, the switch closes in response to a drive signal from a driver;
   a DC offset module coupled between a ground connector and a return port, the DC offset module is configured to provide a DC offset voltage to the return port;
   a controller coupled to the driver via an isolation path; and
   wherein the controller is configured to produce a pulsed voltage between the output port and the return port by sending control signals via the isolation path to the driver to open and close the switch.

2. The pulsed power system of claim 1 including:
   a power path configured to apply power from at least one power source to the driver, wherein the at least one power path galvanically isolates the power source from the driver.

3. The pulsed power system of claim 2, wherein the power source includes an AC power supply and the power path includes:
   a rectifier configured to apply a rectified voltage to the driver; and
   a transformer inductively coupling the AC power supply to the rectifier to galvanically isolate the AC power supply from the driver.

4. The pulsed power system of claim 1, wherein the isolation path includes electro-optical coupling to couple the controller to the driver.

5. The pulsed power supply of claim 1, wherein the switch is selected from the group consisting of FETs and IGBTs.

6. A method for applying pulsed power to a load, the method comprising:
   providing earth-ground-referenced control circuitry;
   providing floating pulsed-power circuitry including an output port and a return port;
   providing a DC offset voltage to the return port of the pulsed-power circuitry with a DC offset module;
   providing a peak voltage to the pulsed-power circuitry with a DC voltage source;
   applying power from a power source of the control circuitry to a driver of the pulsed-power circuitry via a galvanically-isolating power path;
   applying a trigger signal from the control circuitry to the driver via a galvanically-isolated signal path to prompt the driver to produce a driver signal; and
   producing a voltage pulse between the output port and the return port by closing a switch with the driver signal to couple the peak voltage to the output port.

7. The method of claim 6, wherein applying power to the driver includes inductively coupling power from the power source to the driver.

8. The method of claim 6, wherein applying the switching signal via the galvanically isolating signal path includes electro-optically coupling portions of the galvanically-isolating signal path.

9. The method of claim 6, wherein the voltage pulse is characterized by a rise time of less than 1 ms for a change of 1 kV.

10. A pulsed power system comprising:
  means for providing earth-ground-referenced control circuitry;
  means for providing floating pulsed-power circuitry including an output port and a return port;
  means for providing a DC offset voltage to the return port of the pulsed-power circuitry with a DC offset module;
  means for providing a peak voltage to the pulsed-power circuitry with a DC voltage source;
  means for applying power from a power source of the control circuitry to a driver of the pulsed-power circuitry via a galvanically-isolating power path;
  means for applying a trigger signal from the control circuitry to the driver via a galvanically-isolated signal path to prompt the driver to produce a driver signal; and
  means for producing a voltage pulse between the output port and the return port by closing a switch with the driver signal to couple the peak voltage to the output port.

11. The pulsed power system of claim 10, wherein the means for applying power to the driver includes inductively coupling power from the power source to the driver.

12. The pulsed power system of claim 10, wherein the means for applying the switching signal via the galvanically isolating signal path includes electro-optically coupling portions of the galvanically-isolating signal path.

13. The pulsed power system of claim 10, wherein the voltage pulse is characterized by a rise time of less than 1 ms for a change of 1 kV.

* * * * *